Patented July 2, 1940

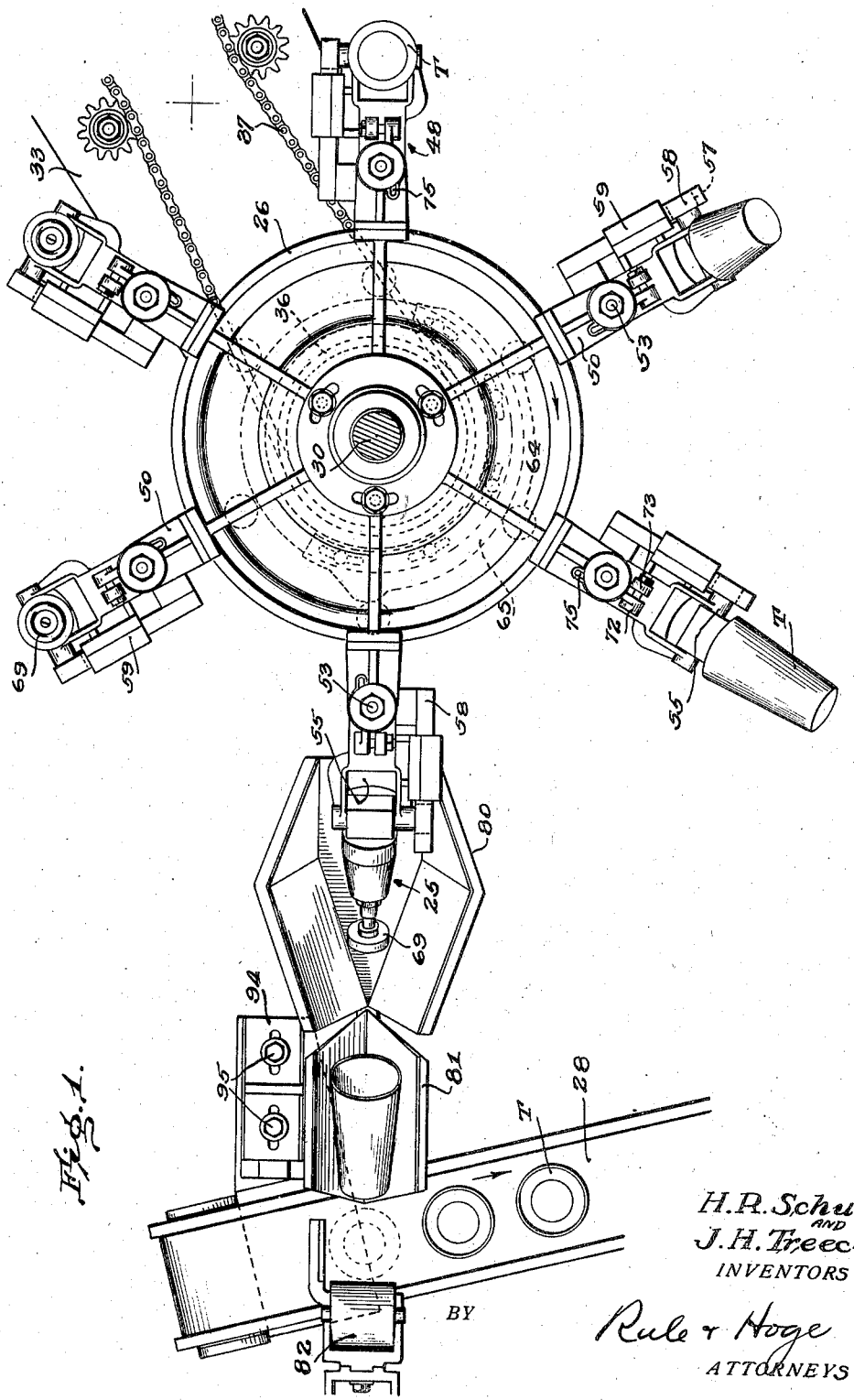

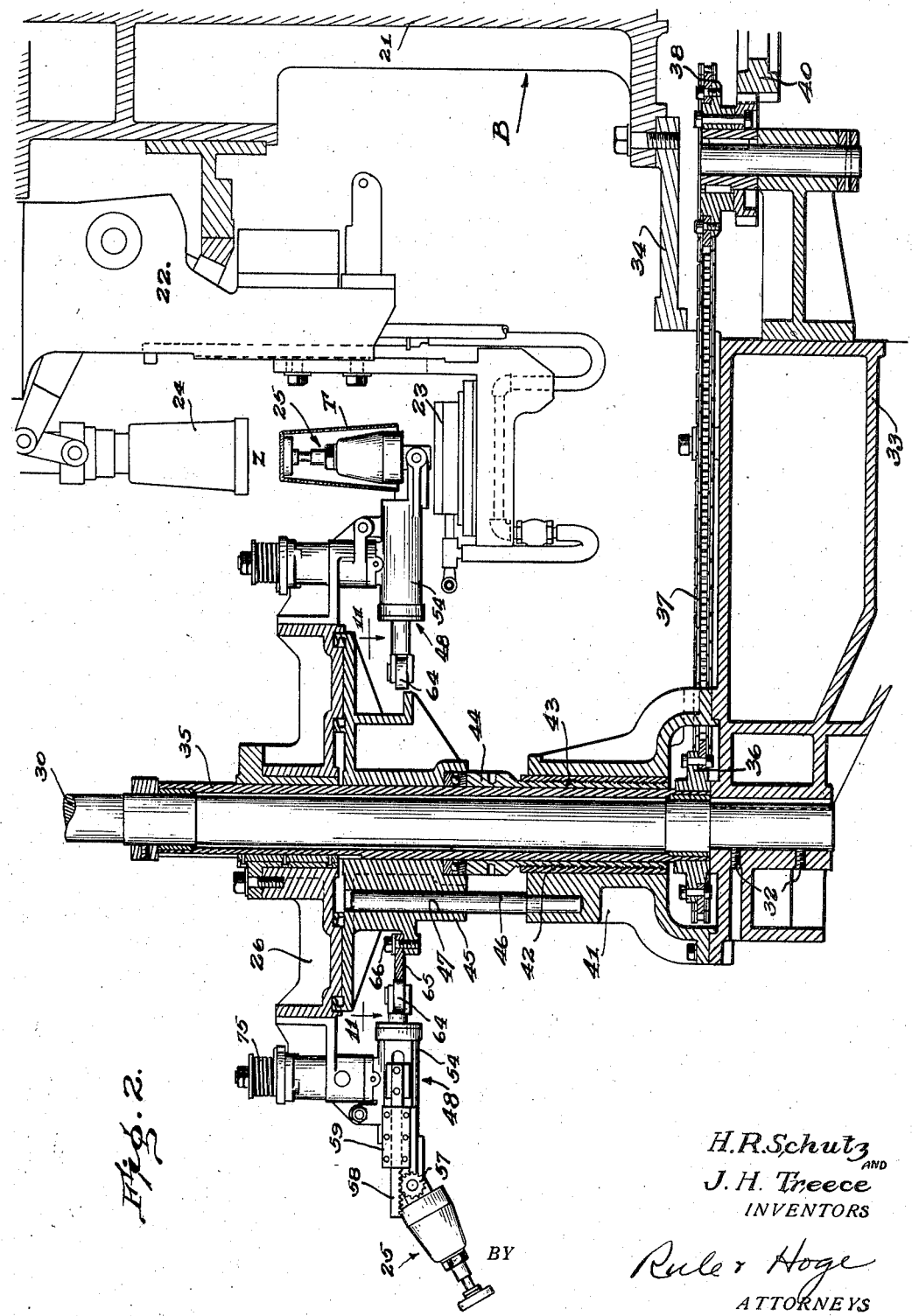

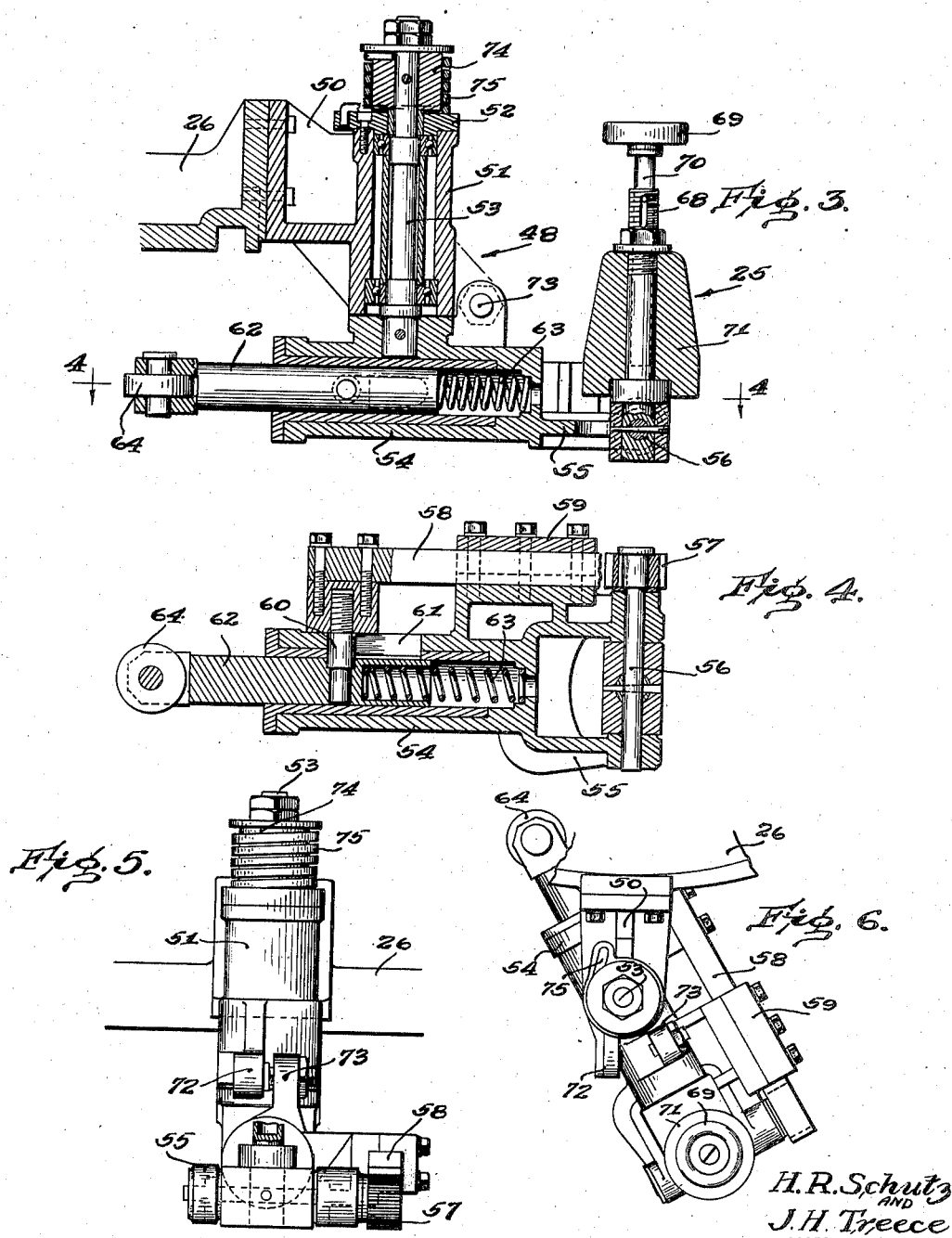

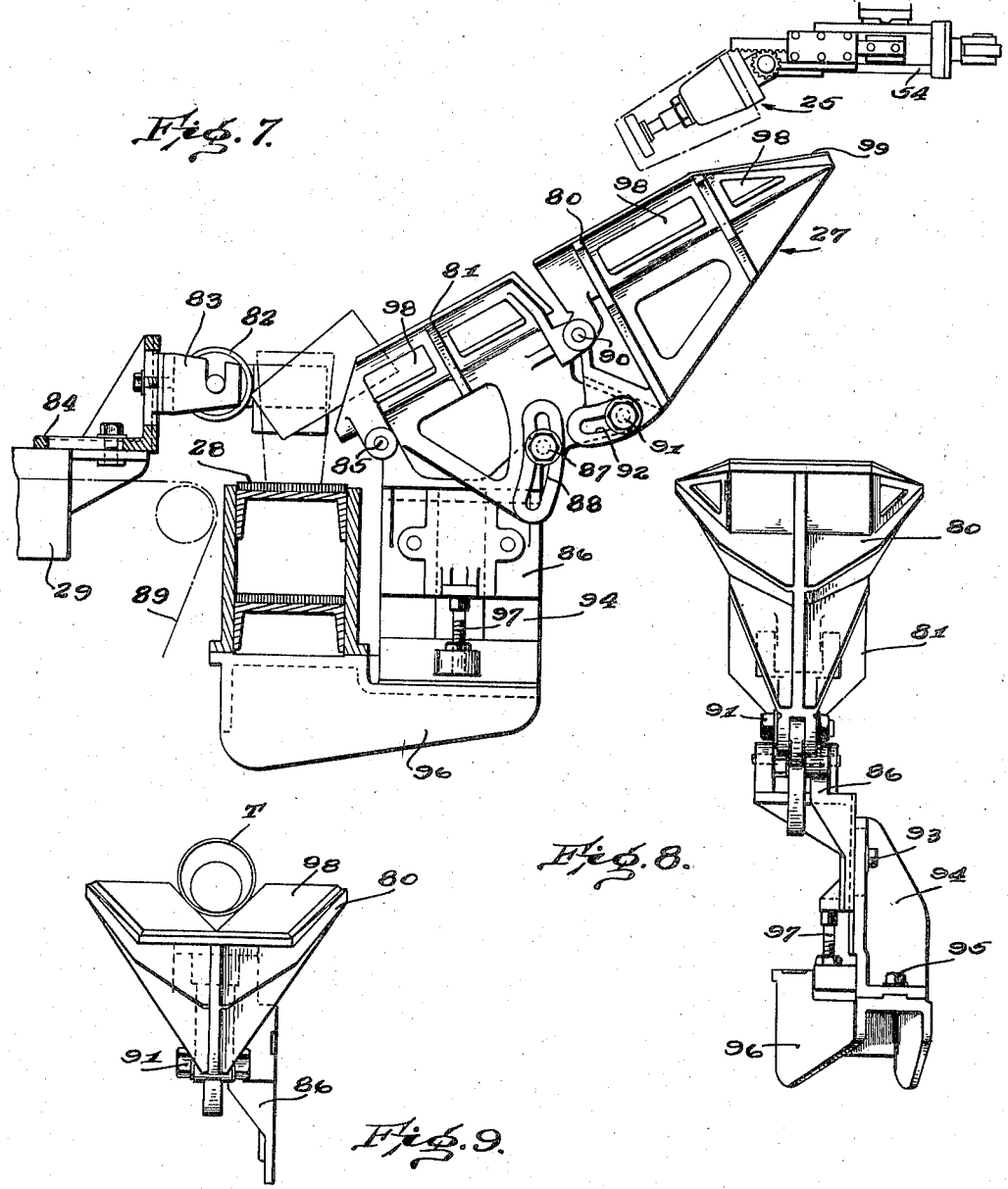

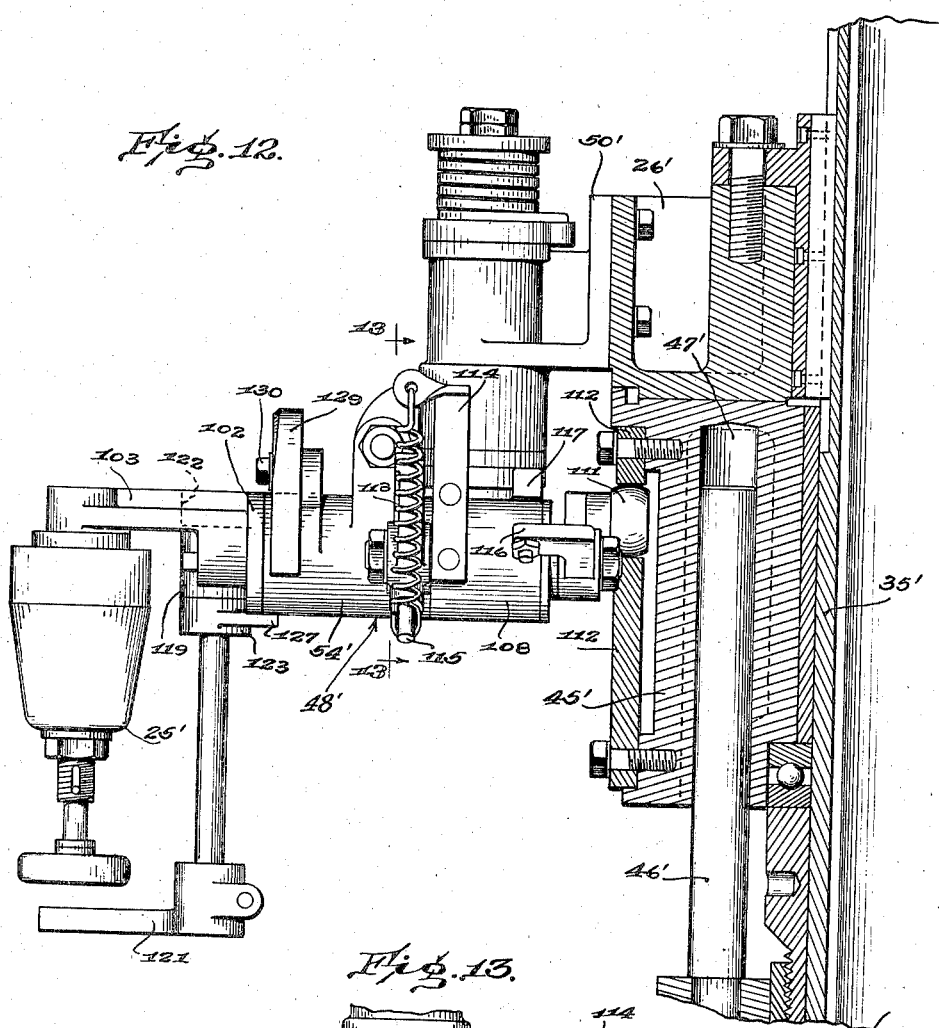
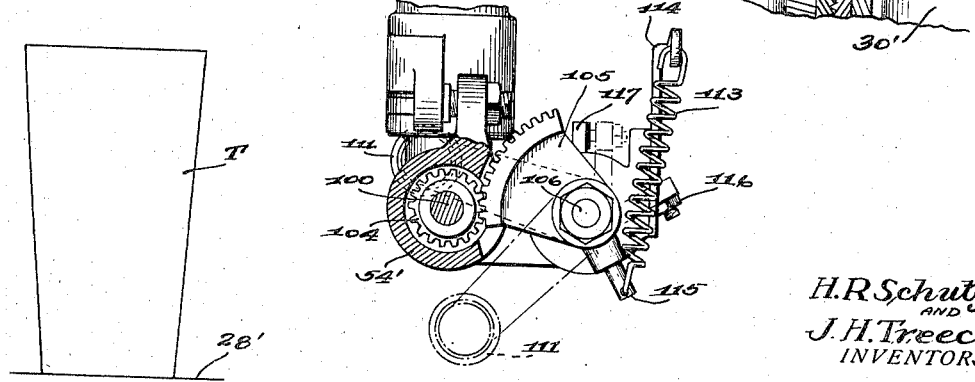

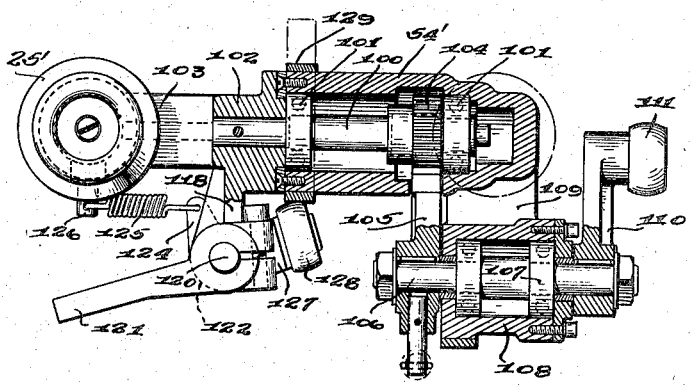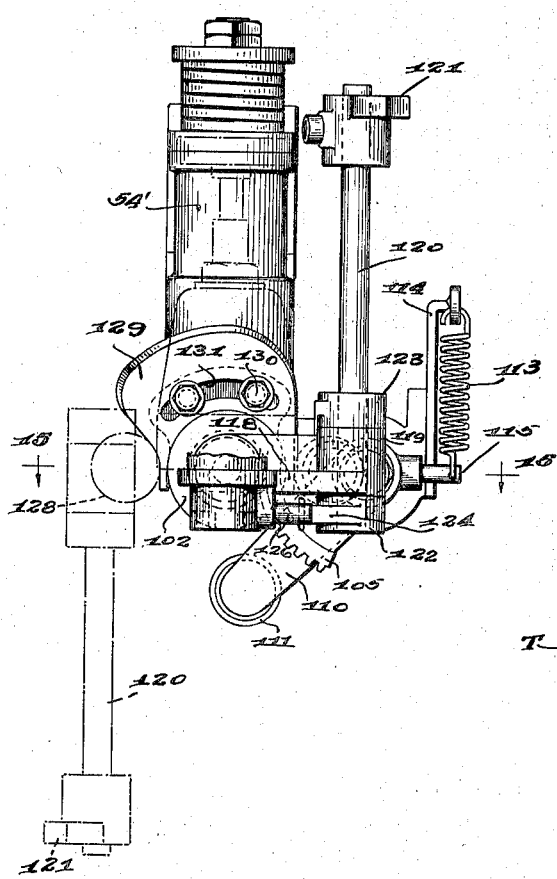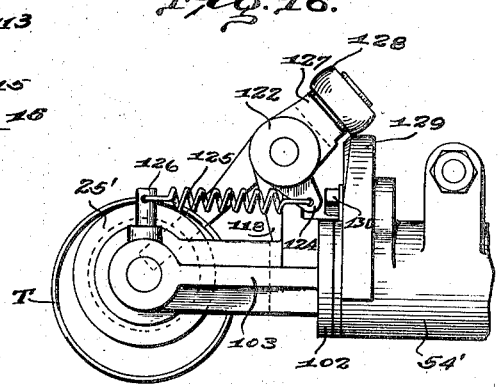

2,206,267

UNITED STATES PATENT OFFICE 2,206,267

TUMBLER HANDLING APPARATUS

Harold R. Schutz and Jesse H. Treece, Toledo, Ohio, assignors to Libbey Glass Company, a corporation of Ohio Application October 26, 1937, Serial No. 171,109

7 Claims. (Cl. 198—25)

The present invention relates to improvements in apparatus for transferring tumblers from which moile has been removed in a rotary burn-off machine, from the machine to an adjacent leer conveyor.

Under modern conditions of glass manufacture, moile is removed from tumblers in a burn-off machine consisting of a rotary carriage having mounted thereon a series of circumferentially spaced burners, above which are positioned and aligned therewith respective vertically movable chucks which receive therein the inverted unfinished tumblers having moile thereon. At a predetermined point in the circular path of movement of the chucks and burners, the tumblers are lowered by the chucks into the region of the respective burners and the moile is burned off. The moile-free tumblers are again elevated and conducted, during the remainder of their circular travel in the machine, to a discharging zone where they are released by the chucks and dropped by gravity in their inverted position onto a series of "pegs" carried by a rotary "peg table," constituting a takeout device, by means of which they are moved clear of the burn-off machine. In the operation of the apparatus just described, it is required that an operator be stationed at the discharge region of the burn-off machine to remove the inverted tumblers from the rotary peg table and place the same on a conveyor in an upright position preparatory to conveying the same to an annealing leer.

The principal object of the present invention is to provide a rotary peg table of the general type set forth above which will dispense with the necessity of employing an operator at the discharging zone of the burn-off machine for the purpose of upending the tumblers and transferring the same to the leer conveyor by performing that operation automatically. Toward this end, the invention contemplates the provision of a transfer apparatus of the type just referred to which operates to receive the inverted tumblers from which moile has been removed and upend the same automatically and place the same in an upright position on a moving leer conveyor.

Another object of the invention is to provide a transfer apparatus which, by a relatively simple adjustment or series of adjustments, is adapted for use with various sizes of burn-off machines, or for use with the same machine when accommodating tumblers of different sizes.

Another object of the invention is to provide a novel form of chute by means of which the tumblers are transferred by gravity from the peg table to the leer conveyor and which is adjustable both as to height and inclination to accommodate different sizes of tumblers issuing from the peg table.

Other objects of the invention, not at this time enumerated, will become apparent as the following description ensues.

In the accompanying drawings:

Fig. 1 is a top plan view of the transfer apparatus, together with a chute designed for cooperation therewith in conveying ware from a burn-off machine to a leer conveyor;

Fig. 2 is a vertical sectional view of the transfer apparatus showing the same operatively associated with a burn-off machine;

Fig. 3 is a fragmentary vertical sectional view taken through one of the ware supporting heads employed in connection with the present invention;

Fig. 4 is a sectional view taken substantially along the line 4—4 of Fig. 3;

Fig. 5 is a fragmentary front elevational view showing one of the ware supporting heads;

Fig. 6 is a fragmentary top plan view showing one of the ware supporting heads swung out of its normal radial alignment;

Fig. 7 is a side elevational view of a chute employed in connection with the present invention and showing the same operatively associated with the transfer apparatus and leer conveyor;

Fig. 8 is an end elevational view of the chute;

Fig. 9 is an end elevational view similar to Fig. 8 but taken from a different angle, namely, the angle of inclination of the chute trough;

Fig. 12 is a fragmentary vertical sectional view similar to Fig. 2, omitting the burn-off machine, and showing a modified form of ware supporting head;

Fig. 13 is a sectional view taken substantially along the line 13—13 of Fig. 12;

Fig. 14 is a front elevational view of the head shown in Fig. 12;

Fig. 15 is a sectional view taken substantially along the line 15—15 of Fig. 14; and Fig. 16 is a fragmentary side elevational view of the head shown in Fig. 12 with a partially upended tumbler thereon.

Figure 10:
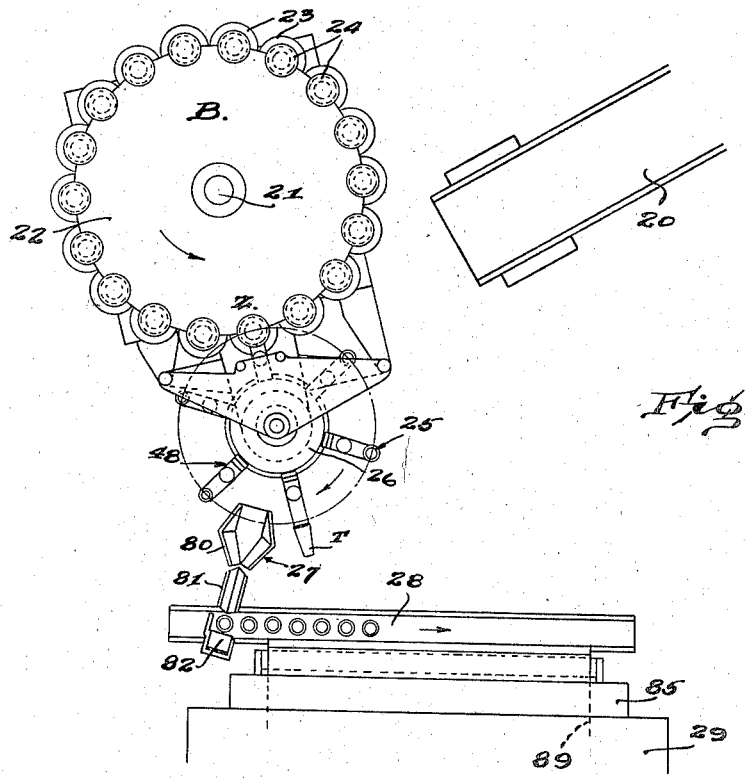
Fig. 10 is a plan view, diagrammatic in its representation, of the burn-off machine, transfer apparatus, chute, and annealing leer, showing the operative relation each bears to the others.

Referring particularly to Fig. 10 wherein the relation of the burn-off machine, transfer apparatus, leer conveyor and chute is diagrammatically represented, the tumblers T having moile thereon and issuing from a forming machine (not shown) are received at the burn-off machine B on a conveyor 20 and are placed in the burn-off machine by an operator.

Briefly, the burn-off machine B herein disclosed (which forms no part of the present invention and for which no claim to novelty is made) is designed to remove moile from the tumblers T and comprises a central column 21 (see also Fig. 2) having mounted thereon a rotatable carriage 22 upon which there are supported a series of vertically adjustable circumferentially spaced burners 23, above which are positioned and aligned therewith respective vertically movable chucks 24 which receive therein the unfinished tumblers T having moile thereon in an inverted position. At a predetermined point in the circular path of movement of the chucks 24 and burners 23, the tumblers are lowered by the chucks into the region of the respective burners and the moile is burned off. The inverted tumblers are again elevated and are conducted, during the remainder of their travel in the machine, to a transfer zone Z where they are released by the chucks 24.

Still referring to Fig. 10, upon release of the inverted tumblers T from the burn-off machine B, the former fall by gravity onto a series of supports 25, commonly referred to as "pegs" carried by a rotary transfer table or "peg table" 26, forming a part of a transfer apparatus comprising the present invention, and by means of which the tumblers are partially upended and deposited in a chute 27 from whence they are deposited in an upright position on a leer conveyor 28 for transfer to an annealing leer 29.

In a modified form of the invention illustrated in Figs. 12 to 16 inclusive, the inverted tumblers T are delivered by the burn-off machine to a series of supports 25' or pegs carried by a transfer table 26' by means of which the tumblers are completely upended and deposited directly on the leer conveyor 28'.

Referring now to Figs. 1 and 2, the transfer table 26 or peg table is rotatably mounted upon a central column 30 which is anchored by means of set screws 32 in a bracket 33 which is secured to the base 34 of the burn-off machine B. A driving sleeve 35 surrounds the column 30, is slightly spaced therefrom, and is provided at its lower end with a sprocket 36 driven by a chain 37 from a sprocket 38 which in turn is driven from the driving gear 40 of the burn-off machine B. A stationary bearing block 41 secured to the bracket 33 is provided with a threaded liner 42 which threadedly receives therein a sleeve 43 having a spanner head 44 thereon by means of which the elevation of the sleeve 43 may be adjusted. A support 45 for the peg table 26 surrounds the driving sleeve 35 and is supported on the upper end of the threaded sleeve 43. Rotation of the support 45 is prevented by means of a guide pin 46 which extends into the bearing block 41 and which projects upwardly therefrom and is slidably received in a vertical bore 47 formed in the support 45.

The transfer table proper 26 is rotatably supported on the support 45 and is keyed to the driving sleeve 35 for rotation therewith. A plurality of peg carrying heads 48 are uniformly spaced about the periphery of the table 26 in radial fashion and are adapted for successive cooperation with the respective heads (i. e. the burners 23 and chucks 24) of the burn-off machine B at the transfer zone Z.

Figure 11:
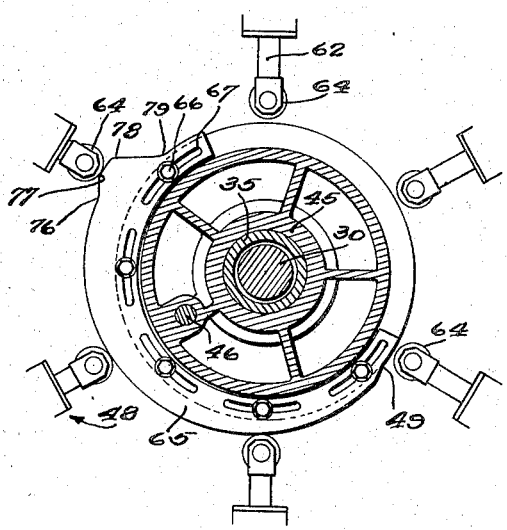
Fig. 11 is a sectional view taken substantially along the line 11—11 of Fig. 2.

Each head 48 (Figs. 2 to 6 inclusive) comprises a bracket 50 having a bearing sleeve 51, provided with a cap 52, formed at the outer end thereof. A rock-shaft 53 is mounted for limited turning movement in the sleeve 51 and projects below the sleeve and has secured to its lower end a casing 54, the forward end of which has formed thereon a bifurcated extension 55. A horizontal rock-shaft 56 extends across the furcations of the extension 55 and has a pinion 57 mounted on one end thereof. The pinion 57 meshes with a toothed rack 58 slidably mounted in a guide 59 and connected, by means of a pin 60 which passes through a slot 61 in the casing 54, to a plunger 62 which is slidably disposed within the casing 54. A coil spring 63 serves to normally maintain the plunger 62 extended from the casing 54. A cam roller 64 mounted on the free end of the plunger 62 bears against a stationary arcuate cam plate 65 (Figs. 2 and 11) which is adjustably secured to the support 45 by means of clamping bolts 66 which extend through slots 67 formed in the same. The tumbler support 25 (Fig. 3) comprises a hollow spindle 68 the lower end of which is pinned to the rock-shaft 56. A cushioning member 69, preferably having a heat resisting surface of asbestos or the like, is provided with a shank 70 which is yieldably and slidably mounted within the spindle 68. A centering member 71 is mounted on the spindle 68 medially thereof and is preferably formed of carbon or other heat resisting material. The inverted tumblers T issuing from the chucks 24 of the burn-off machine B are received over the cushioning members 69 with the rim thereof surrounding the centering members 69 as illustrated in Fig. 2.

Referring now to Figs. 3, 5 and 6, the bearing sleeve 51 has formed thereon an abutment 72 designed to be engaged by an adjustable limit stop 73 on the casing 54 to determine the normal radial position of the head. The upper end of the rock-shaft 53 has secured thereto a torque member 74 and a torque spring 75 has its upper end secured to the torque member while the lower end thereof is anchored in the bearing cap 52. By such a construction, the casing 54 and plunger 62 are normally and yieldingly maintained in their radial positions.

Referring to Fig. 2, it will be seen that in the transfer of the tumblers T from the chucks 24 of the burn-off machine B, the upright supports 25 or pegs are moved successively beneath the chucks 24 and between the chucks and their respective burners 23. The inverted tumblers T are released by the chucks 24 at the transfer zone Z and fall onto the pegs 25 in the manner previously set forth. Should for any reason whatsoever a particular tumbler fail to be completely released by its chuck 24 and depend into the path of one of the pegs 25, or should a tumbler be prematurely released by its chuck and fall on the burner 23, the peg 25, upon striking the tumbler will cause the entire swinging portion of the head 48 to swing out of its normal position of radial alignment against the action of the spring 75 and clear the tumbler. Likewise, should an operator of the burn-off machine, or other person, or any object, whether in the vicinity of the burn-off machine or anywhere in the path of travel of the heads 48, come into contact with the peg 25 or its supporting casing 54, the peg and supporting casing 54 will be moved from its position of radial alignment as shown in Fig. 6 to clear the obstruction.

It will be seen from an inspection of Fig. 7 that at a predetermined zone in the path of rotation of the heads 48, the pegs 25 become inclined beyond the horizontal in such a manner that the tumblers T carried thereby are deposited by gravity in the chute 27, previously referred to, and are conducted thereby to the leer conveyor 28. Toward this end, the cam rollers 64 and plungers 62 carried by each head 48 move in a clockwise direction as indicated by the arrows in Fig. 11 and, from the time the heads travel in a circular path from the transfer zone Z until the cam rollers 64 engage the stationary cam plate 65, the pegs 25 remain upright with the tumblers T thereon. At a point 49 on the cam plate 65, the cam rollers 64 engage the cam plate and commence to be moved outwardly from the center of the axis of revolution of the heads 48. This outward movement of the rollers 64 continues gradually from the point 49 to a point 76 on the cam plate 65 during which time the plungers 62 are slowly moved into the casing 54 (Fig. 3) thus causing the pegs 25 and tumblers thereon to gradually incline toward the horizontal in the manner previously described. At the point 76, the rollers 64 encounter a relatively sharp incline and, in moving from the point 76 to a point 77, the pegs 25 become inclined beyond the horizontal in such a manner that the tumblers T thereon slide by gravity onto the chute 27. At a point 78, the rollers 64 encounter a relatively sharp reverse incline and, in moving to a point 79, the plungers 62 are again extended from the casing 54 to restore the pegs 25 to an upright position preparatory to arriving at the transfer zone Z.

In the normal operation of the burn-off machine (Fig. 2), if the tumblers T are relatively deep, the level of the adjustable burners 23 will be comparatively lower than if the tumblers are relatively shallow. In order to insure maximum efficiency in the transfer of the tumblers to the pegs 25, it is necessary to adjust the level of the transfer table 26 or peg table by means of the spanner head 44 in the manner previously described so that the pegs 25 will not only clear the burners 23 and tumblers T, but will also pass beneath the chucks 24 at a predetermined distance therebelow. To secure the proper relation between the pegs 25, burners 23, chucks 24 and tumblers T, it may also be necessary, especially where chucks of extremely large or small dimensions are substituted in the burn-off machine, to substitute correspondingly longer or shorter pegs 25 in the transfer apparatus as the case may require. Irrespective however of these details in practice, the essential features of the invention are always preserved.

Referring to Fig. 7, if the level of the peg table 26 and pegs 25 carried thereby is relatively high, as for example where small size tumblers are being removed from the burn-off machine, conditions require that the level of the chute 27 be comparatively high. In the transfer of larger size tumblers, both the level of the peg table 26 and of the chute 27 will be correspondingly lower. Furthermore, where small size tumblers are in the process of transfer, the inclination of the chute 27 from the horizontal must be comparatively steeper than where larger size tumblers which are heavier are being transferred, since in any instance the gravitational pull on the tumblers must be sufficient not only to overcome the tendency of the tumblers to be frictionally retarded on the chute, but also to give gravitational impetus to the tumblers. Toward these ends, the chute 27 is adjustable both as to height and as to inclination.

The chute 27 (Figs. 7, 8 and 9) comprises two main castings, an upper casting 80 designed to give initial impetus to the tumblers issuing from the pegs 25, and a lower casting 81 designed to direct the tumblers T into engagement with a roller 82 suspended in a bracket 83 mounted on a support 84 on the annealing leer 29. The roller 82 occupies a position on the far side of the leer conveyor 28 in the path of the oncoming tumblers and is adapted to be successively engaged by the base portions of the tumblers issuing from the chute 27 to complete the upending operation of the tumblers and direct the upended tumblers onto the leer conveyor 28. The moving leer conveyor 28 serves to "string out," align and space the tumblers transversely of the leer 29 and, when a series of the tumblers have been so strung out, aligned and spaced across the leer entrance, the series is bodily shifted as a unit by a conventional leer loader (not shown) into the leer and is deposited on the leer belt which is diagrammatically illustrated at 89.

The lower casting 81 of the chute 27 is pivoted as at 85 to a vertically adjustable block 86 and the inclination of the casting 81 may be adjusted on the block 86 by means of a clamping bolt 87 which extends through a slot 88 provided in the casting. The upper casting 80 is pivoted as at 90 to the lower casting 81 and the inclination of this latter casting may be adjusted by means of a clamping bolt 91 extending through a slot 92 provided in the casting 80. The block 86 is adjustably clamped as at 93 to a bracket 94 for vertical adjustment thereon while the bracket 94 is adjustably clamped as at 95 to the support 96 for the leer conveyor 28 for lateral adjustment thereon. A spacing bolt 97, extending between the block 86 and a stationary part of the bracket 94, permits accuracy of adjustment of the height of the block 86.

The upper and lower castings 80 and 81 respectively of the chute 27 are generally of V-shape in cross section in the trough portions thereof and each is lined with a suitable heat-resistant material 98 such as asbestos. The upper casting 80 tapers as at 99 in the trough portion thereof toward a common axis and terminates well within the radial sweep of the partially upended pegs 25 and tumblers T thereon.

In the modified form of the invention shown in Figs. 12 to 16 inclusive, the general characteristics of the transfer table 26', the support 45' therefor, the driving sleeve 35', guiding means 46', 47', and other associated parts including the driving mechanism for the central column 30' remain substantially the same as in the form of the invention disclosed in the foregoing Figs. 1 to 11 inclusive. In the latter form of the invention, a modified form of peg carrying head 48' is disclosed, by means of which the tumblers T are received from the burn-off machine at the transfer zone Z and are deposited directly on the leer conveyor 28'.

The head 48' comprises a casing 54' which is suspended from a bracket 50' for swinging movement out of its normal radial position in identically the same manner that the casing 54 (Fig. 3) is suspended from the bracket 50. A rock-shaft 100 (Fig. 15) journaled in bearings 101 in the casing 54' projects from one end of the casing and has secured thereto a bracket 102 provided with an extension 103 on which the tumbler support 25' or peg is mounted. The rock-shaft 100 has mounted thereon within the casing 54' a pinion 104 (Figs. 13 and 14) which meshes with a gear segment 105 mounted on a shaft 106 which is journaled for rocking movement in bearings 107 carried by a sleeve 108 formed on a lateral extension 109 of the casing 54'. The shaft 100 is provided with a crank arm 110 provided with an eccentric cam roller 111 which is guided between upper and lower arcuate cam members 112 secured to the support 45'. A coil spring 113 (Figs. 12 and 13) connected at one end to a stationary bracket 114 secured to the extension 108, and connected at its other end to a pin 115 secured in the gear segment 105, serves to normally maintain the shaft 100 in an initial position. An adjustable abutment 116 mounted on the crank arm 110 is adapted to engage a limit stop 117 on the casing 54' to determine the initial position of the shaft 100. The initial position of the shaft 100 just referred to is such that the peg 25' will be substantially vertical in order that upon revolution of the heads 48' about the central column 30' the pegs 25' will pass between the chucks 24 and burners 23 (Fig. 2) of the burn-off machine B to receive the inverted tumblers T thereon.

The nature of the upper and lower cam members 112 is such that upon rotation of the transfer table 26', the elevation of the cam rollers 111 is varied in such a manner that as the individual heads 48' approach the leer conveyor 28', the shaft 100 is rocked about its axis and assumes the extreme inverted position illustrated in Fig. 12 when the heads 48' overlie the leer conveyor.

In order to maintain the tumblers T on the pegs 25' after the latter have become inclined beyond the horizontal, the bracket 102 (Figs. 12 to 16 inclusive) is provided with a lateral extension 118 having a sleeve 119 at its outer end in which there is journaled a rock-shaft 120. The rock-shaft 120 extends parallel to the axis of the peg 25' and carries at its free end a finger 121 which is adjustably clamped thereto and which, upon rocking movement of the shaft 120, is adapted to be moved over the end of the peg 25' to retain the tumbler T thereon. The shaft 120 has secured thereto on opposite sides of the sleeve 119 collars 122 and 123. The collar 122 has formed thereon a lug 124 which is connected to one end of a coil spring 125, the other end of the spring being connected to a pin 126 secured in the extension 103. The collar 123 has formed thereon a radially extending arm 127 on which there is mounted a cam roller 128 designed for engagement with a cam member 129 which is adjustably secured to the casing 54' by means of clamping bolts 130 extending through a slot 131 formed in the cam member 129.

The nature of the cam member 128 is such that when the peg 25' occupies an upright vertical position as shown in Figs. 13 and 14, the tumbler retaining finger 121 is maintained by the action of the coil spring 125 (Fig. 16) is an operative position. However, when the peg 25' becomes inclined and approaches the horizontal, the cam roller 128 rides upwardly on the cam member 129 and the finger 121 moves into tumbler retaining position with the tumbler resting thereagainst and partially supported thereon until the peg 25' assumes an inverted vertical position at which time the tumbler is released by the finger 121 which returns to its inoperative position due to the cam roller 128 moving downwardly on the cam 129 under the influence of the spring 125. The tumbler T carried on the peg 25' is thus released and by gravity falls directly onto the leer conveyor 28' from whence it is ultimately transferred to the leer by means of the leer loader previously referred to.

Modifications may be resorted to within the spirit of the appended claims.

We claim:

1. A device for transferring tumblers and like articles comprising a plurality of vertically disposed arms mounted for revolution about a vertical axis, said arms being adapted to loosely receive thereover the articles in an inverted position at a receiving zone, said arms each being pivoted for individual swinging movement in a vertical plane, means operable upon revolution of said arms for causing the same to become inclined beyond the horizontal in their respective planes of swinging movement to discharge the articles thereon by gravity, and means for revolving said series of arms about the vertical axis.

2. A device for transferring tumblers and like articles comprising a plurality of vertically disposed arms mounted for revolution about a vertical axis, said arms being adapted to loosely receive thereover the articles in an inverted position at a receiving zone, said arms each being pivoted for individual swinging movement in a vertical plane, means operable upon revolution of said arms for causing the same to become inclined beyond the horizontal in their respective planes of swinging movement to discharge the articles thereon by gravity, means for raising or lowering the level of said arms simultaneously, and means for revolving said series of arms about the vertical axis.

3. A device for transferring tumblers and like articles comprising a plurality of vertically disposed arms mounted for revolution about a vertical axis, said arms being adapted to loosely receive thereover the articles in an inverted position at a receiving zone, said arms each being pivoted for individual swinging movement in a vertical plane passing through said vertical axis, means operable upon revolution of said arms for causing the same to become inclined beyond the horizontal in their respective planes of swinging movement to discharge the articles thereon by gravity, and means for revolving said series of arms about the vertical axis.

4. A device for transferring tumblers and like articles comprising a plurality of vertically disposed arms mounted for revolution about a vertical axis, said arms being adapted to loosely receive thereover the articles in an inverted position at a receiving zone, said arms each being pivoted for individual swinging movement in a vertical plane passing through said vertical axis, means operable upon revolution of said arms for causing the same to become inclined beyond the horizontal in their respective planes of swinging movement to discharge the articles thereon by gravity, means for raising or lowering the level of said arms simultaneously, and means for revolving said series of arms about the vertical axis.

5. A device for transferring tumblers and like articles comprising a carriage mounted for rotation about a vertical axis, a plurality of arm-supporting members pivoted to the carriage at spaced points near the periphery of the same, means yieldingly maintaining said members parallel with said vertical axis, an arm pivoted to each member for swinging movement in a vertical plane, said arms normally occupying substantially upright positions and being adapted to receive loosely thereover the inverted articles at a receiving zone, means operable upon rotation of the carriage for causing the arms to become inclined beyond the horizontal in their respective planes of swinging movement to discharge the articles thereon by gravity, and means for rotating the carriage.

6. In a tumbler transfer apparatus, a spider mounted for rotation about a vertical axis, a plurality of arms extending radially from the spider, a rack radially slidable on each arm, cam means controlling the radial movements of said rack, a yieldable lost motion device connecting said cam means and the rack, a pinion mounted for rotation about a horizontal axis and meshing with the rack, a tumbler supporting arm connected to the pinion and movable therewith from a substantially upright position to a position inclined beyond the horizontal, and means for rotating said spider about the vertical axis.

7. In a tumbler transfer apparatus, a spider mounted for rotation about a vertical axis, a plurality of arms extending radially from the spider, a rack radially slidable on each arm, cam means controlling the radial movements of said rack, a pinion mounted for rotation about a horizontal axis and meshing with the rack, a tumbler supporting arm connected to the pinion and movable therewith from a substantially upright position to a position inclined beyond the horizontal, and means for rotating the spider about the vertical axis.

HAROLD R. SCHUTZ.
JESSE H. TREECE.